United States Patent [19]

Tamura

[11] Patent Number: 4,540,273
[45] Date of Patent: Sep. 10, 1985

[54] APPARATUS FOR DRIVING OPTICAL SYSTEM FOR EXPOSURE OF A COPYING MACHINE

[75] Inventor: Takashi Tamura, Higashimine, Japan

[73] Assignee: Konishiroku Photo Industry Co., Ltd., Tokyo, Japan

[21] Appl. No.: 464,903

[22] Filed: Feb. 8, 1983

[30] Foreign Application Priority Data

Feb. 9, 1982 [JP] Japan .................................. 57-19044

[51] Int. Cl.$^3$ ............................................. G03B 27/50
[52] U.S. Cl. ......................................... 355/8; 355/51
[58] Field of Search ....................... 355/51, 60, 66, 65, 355/8, 11

[56] References Cited

U.S. PATENT DOCUMENTS 4,108,544  8/1978  Mitsuyama et al. .................... 355/8

Primary Examiner—L. T. Hix
Assistant Examiner—Della J. Rutledge
Attorney, Agent, or Firm—Frishauf, Holtz, Goodman & Woodward

[57] ABSTRACT

An electrophotographic copying system has an optical system which is movable in the forward and reverse directions to scan an original document to be copied. A drive controller, including spring clutches and an actuating lever are provided to cause improvement of the optical system in the forward and reverse directions. Also provided is a cam for stopping movement of the optical system at a predetermined position.

9 Claims, 7 Drawing Figures

FIG. 5
FIG. 6
FIG. 7
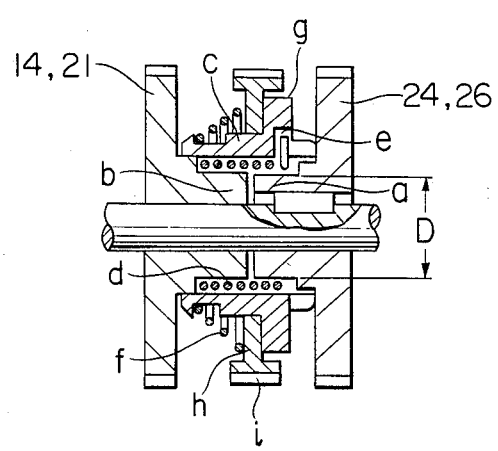
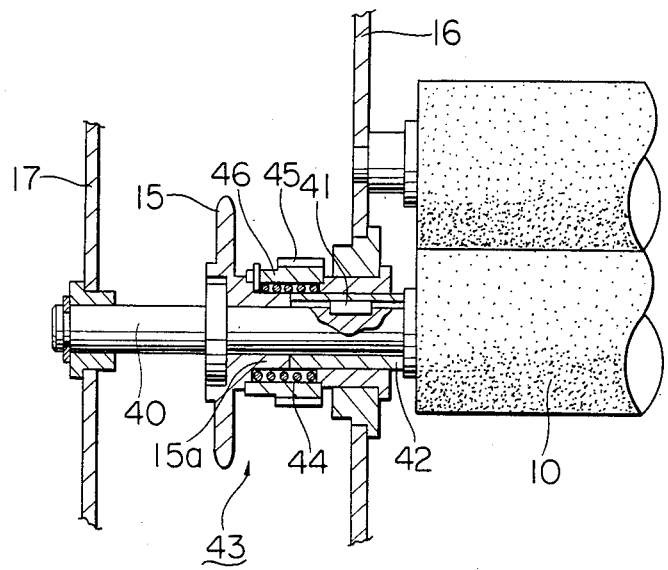
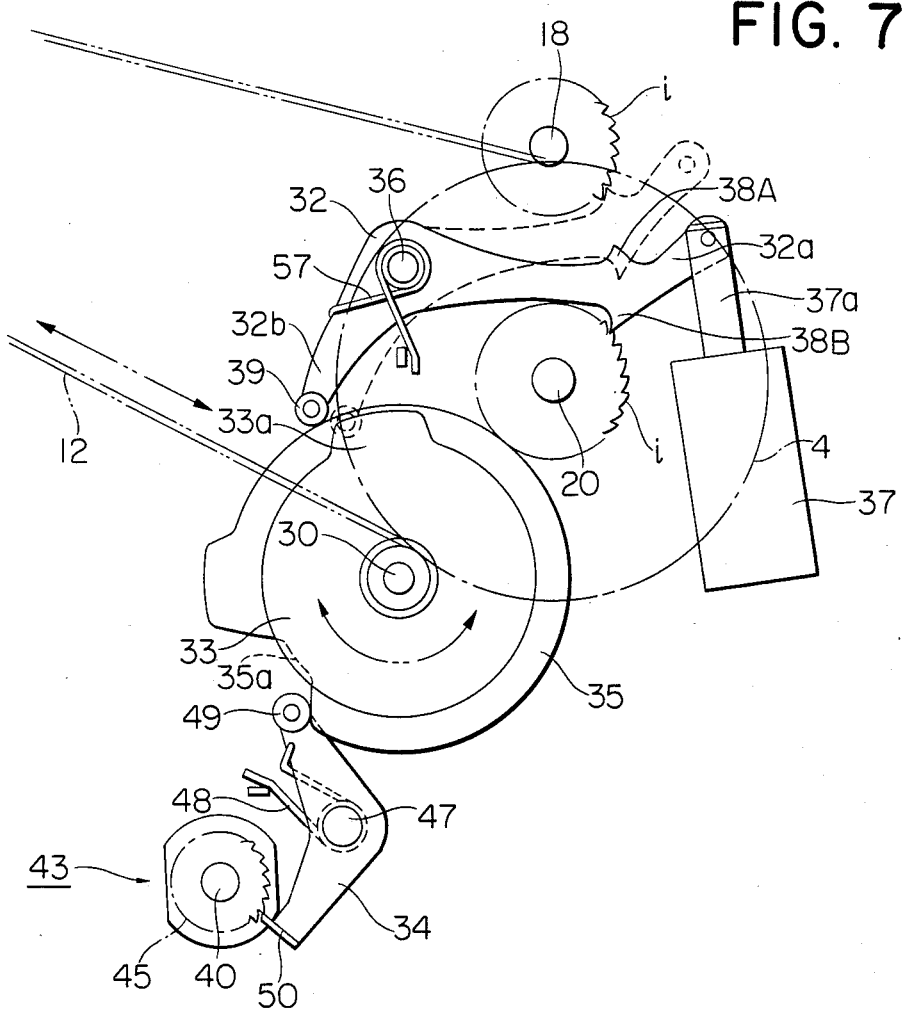

APPARATUS FOR DRIVING OPTICAL SYSTEM FOR EXPOSURE OF A COPYING MACHINE

BACKGROUND OF THE INVENTION

1. Field of the Invention

The present invention relates generally to a driving apparatus for a copying machine and in particular concerns a driving apparatus for an optical system for exposure which is destined to perform an optical scanning of an original or document to be duplicated or copied.

2. Description of the Prior Art

In a hitherto known controllable drive apparatus for driving reciprocatively an optical system for exposure which is destined to perform an optical scanning of an original or document to be copied, the driving system interposed between the drive motor and the optical system for exposure includes a first electromagnetic clutch for effecting the forward movement of the optical system and a second electromagnetic clutch for effecting the backward movement of the optical system, wherein these electromagnetic clutches are adapted to be controlled by a copying command signal or a signal produced by a limit switch or switches such as a microswitch.

The apparatus of the structure described above suffers a drawback that high manufacturing cost is involved due to the use of the expensive electromagnetic clutches and relays.

SUMMARY OF THE INVENTION

With the present invention, it is contemplated to provide an apparatus for driving the optical system for exposure which can be realized as inexpensively as possible. In view of this object, it is taught according to the invention that the driving of the optical system be controlled with the aid of a pair of spring clutches and an actuating means for controlling these spring clutches, which can be implemented inexpensively.

In the following, the present invention will be described in detail in conjunction with exemplary embodiments thereof by referring to the accompanying drawings.

BRIEF DESCRIPTION OF THE DRAWINGS

FIG. 5 illustrates in detail the structure of the first and second spring clutches;

FIG. 6 show in detail the paper feeding unit of the invention; and

FIG. 7 shows in detail the motion reversing mechanism of the invention.

DETAILED DESCRIPTION OF THE PREFERRED EMBODIMENT

Figure 1:
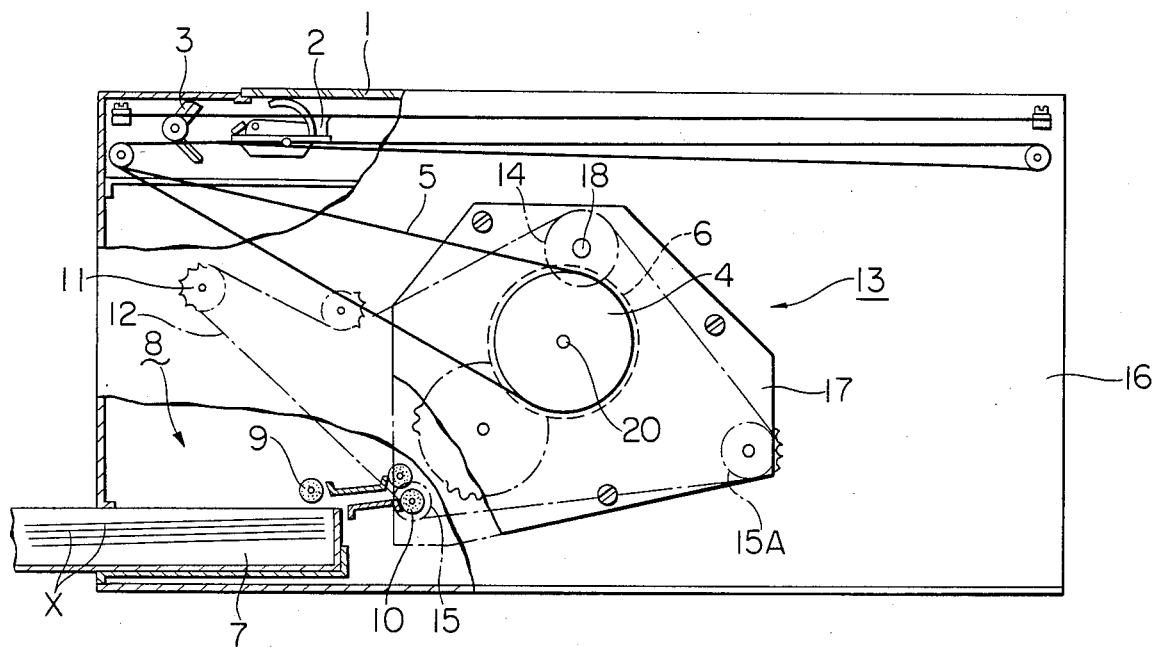
FIG. 1 schematically illustrates an electrophotographic copying machine to which the present invention is applied.

Referring to FIG. 1, an electrophotographic copying machine to which the present invention is applied comprises an optical system for exposure for optically scanning a surface of an original or document disposed on a document supporting glass plate 1. More specifically, the optical system for exposure as illustrated is of the type in which the optical system is movable and includes a first movable carriage 2 provided with an illuminating or exposure lamp and a slit member, and a second carriage 3 incorporating a pair of mirrors and adapted to be driven in the same direction as the first carriage 2. Both of the first and second carriages 2 and 3 are reciprocatively moved by means of a driving wire 5 under a driving force of a wire pulley 4 and serve to focus the image of the original or document on a peripheral surface of a photosensitive drum 6 indicated by a broken line.

Further, the illustrated electrophotographic copying machine incorporates a paper supplying apparatus 8 for supplying copying sheets X accommodated within a cassette 7 to the photosensitive drum 6 on a sheet-by-sheet base. The paper supplying apparatus 8 includes an extracting roller 9 for taking out the copying paper X sheet by sheet from the cassette 7 and a paper feeding roller or member 10 for feeding the copying sheet X dispensed from the extracting roller 9 to the photosensitive drum 6 under an appropriate timing. A driving sprocket 11 fixedly mounted on the output shaft of a driving motor (not shown) is operatively coupled to the aforementioned wire pulley 4 and the sheet feeding roller 10 through a transmission chain 12 for transmitting thereto a driving power. To this end, the transmission chain 12 driven in the direction indicated by an arrow A in FIG. 2 is suspended over an input sprocket 14 of a driving unit 13 for controlling the wire pulley 4, an intermediate sprocket 15A and an input sprocket 15 of the sheet feeding roller 10.

Figure 2:
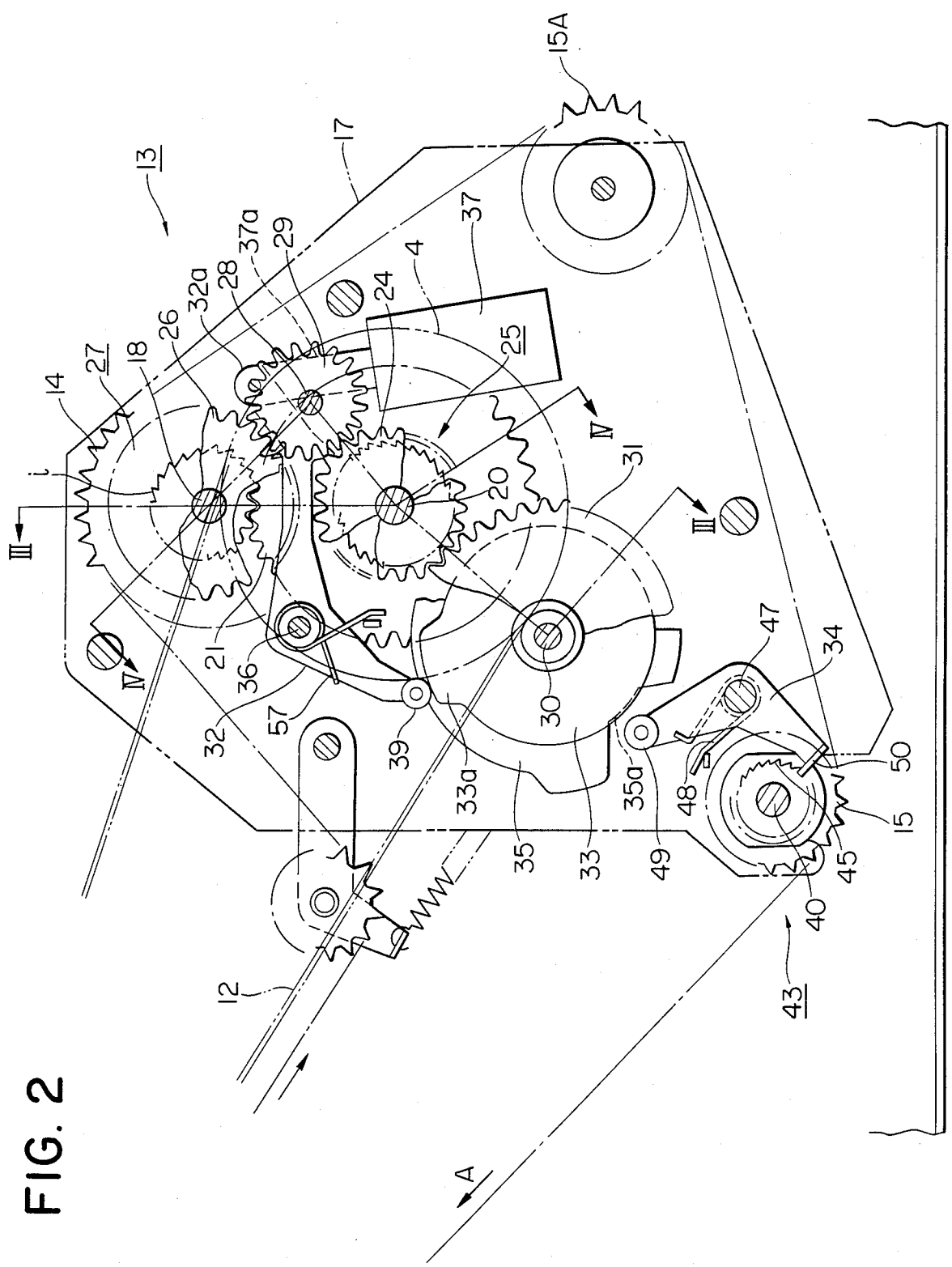
FIG. 2 is a schematic view illustrating the operational features of the copying machine.
Figure 3:
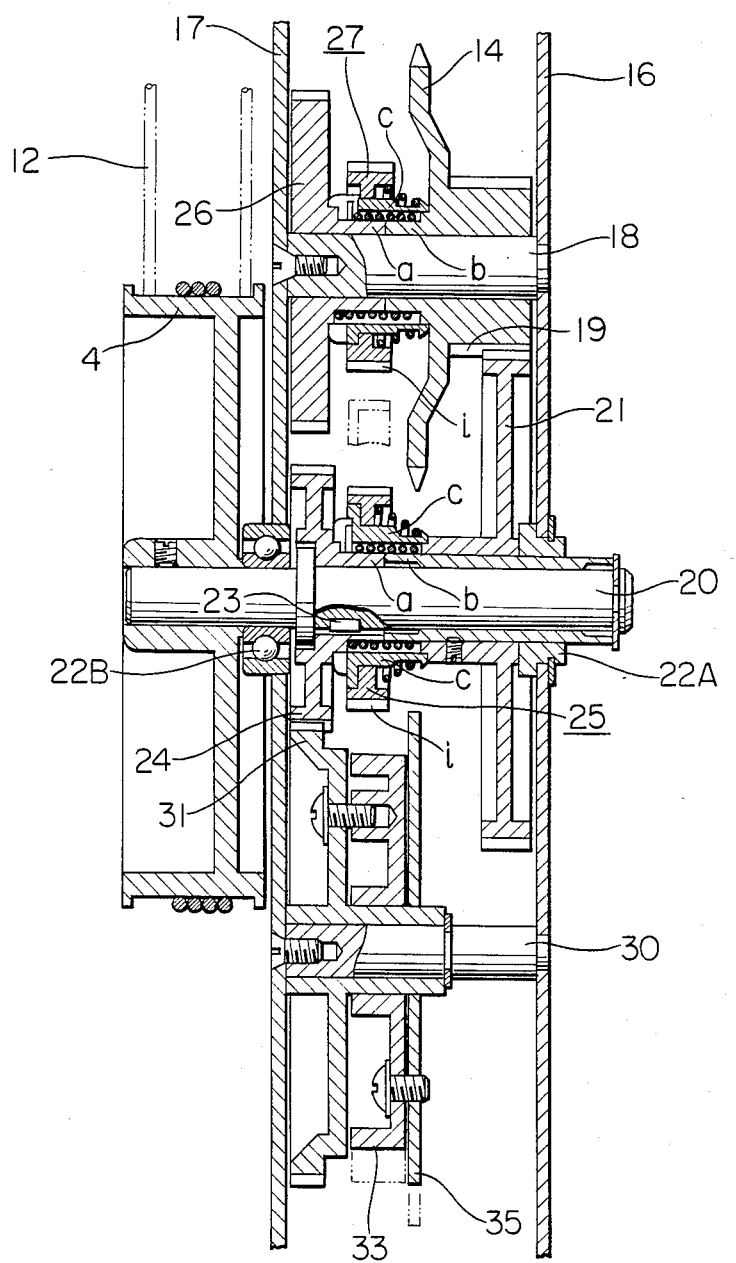
FIG. 3 shows in detail a structure of the drive control unit for the invention.
Figure 4:
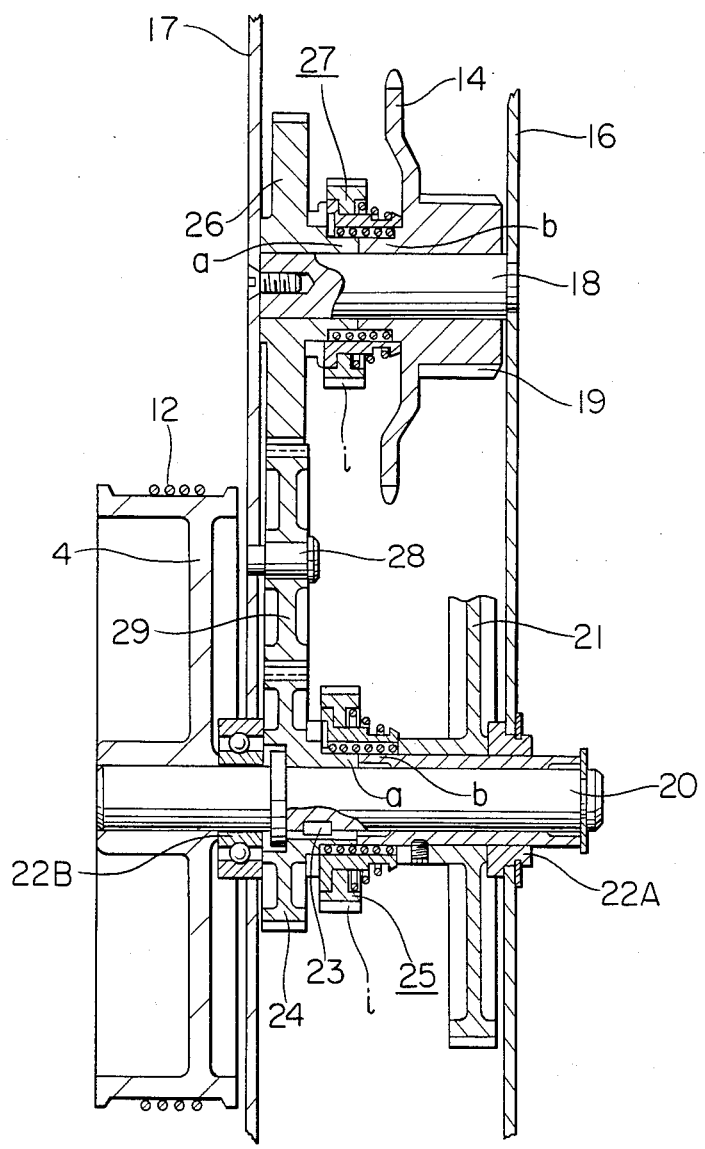
FIG. 4 shows in detail another drive control unit of the invention.

Referring to FIGS. 2 to 4 which show in detail a structure of the aforementioned drive control unit for the wire pulley 4, the input sprocket 14 is rotatably supported on a first supporting shaft 18 which extends between a side frame 16 of the machine and a mounting plate 17 fixedly disposed with a predetermined distance from the side frame 16. The input sprocket 14 has a driving spur wheel 19 formed integrally therewith, which wheel 19 meshes with a reduction gear wheel 21 of a large diameter mounted rotatably on a shaft 20 of the pulley 4, as shown in FIG. 3. The shaft 20 having the wire pulley 4 fixedly mounted at one end portion thereof is supported between the side frame 16 of the machine and the mounting plate 17 by means of bearings 22A and 22B. A trailing gear 24 is fixedly mounted on the shaft 20 by means of a key 23 in juxtaposition with the reduction gear wheel 21. A first spring clutch 25 is interposed between a hub a of the trailing gear 24 and a hub b of the reduction gear wheel 21 for transmitting selectively the movement of the reduction gear 21 to the trailing gear wheel 24. Details of the first spring clutch will be described hereinafter. The input sprocket 14, the driving spur wheel 19, the reduction gear 21 and the trailing gear 24 described above constitute a first driving system for driving the wire pulley in the forward direction.

On the other hand, an intermediate gear wheel 26 is mounted freely rotatably on the first supporting shaft 18 at a position adjacent to the input sprocket 14 with a second spring clutch 27 being interposed between a hub a of the intermediate gear 26 and a hub b of the input sprocket 14. The intermediate gear wheel 26 meshes with an inversion gear wheel 29 which is supported on a second supporting shaft 28 mounted fixedly on the mounting plate 7, as is shown in FIG. 4. The inversion gear wheel 29 constantly meshes with the aforementioned trailing gear wheel 24. In this way, the input sprocket 14, the intermediate gear wheel 26, the inversion gear wheel 29 and the trailing gear wheel 24 constitute a second driving system for rotating the wire pulley 4 in the reverse or backward direction, wherein the wire pulley 4 is rotated in the backward direction through this second driving system when an external force is applied to the sleeve c of the second spring clutch 27.

Further disposed between the side frame 16 of the machine and the mounting plate 17 is a third supporting shaft 30 on which a cam gear wheel 31 is rotatably mounted and meshes with the aforementioned trailing gear wheel 24 so as to be rotated in synchronism with the wire pulley 4. Integrally formed with the cam gear wheel 31 are a stopper cam 33 for stopping the rotation of the wire pulley 4 in response to actuation of a manipulating lever 32 and a control cam 35 which actuates a cam follower 34 described hereinafter to thereby impart a rotating force or torque to the aforementioned sheet feeding roller 10.

FIG. 5 illustrates a structure of the first and the second spring clutches 25 and 27. Referring to the figure, an end portion of a coil spring d is tightly wound around the hub b of the driving gear wheel (e.g. the input sprocket 14 or the reduction gear 21) so that the coil spring d may be rotated together with the hub b. The other end portion of the coil spring d is fitted on the hub a of the driven gear wheel (e.g. the intermediate gear wheel 26 or the trailing gear wheel 24). It should be noted that the hub a has an outer diameter D which is smaller than the inner diameter of the coil spring d. The end of the coil spring d located at the hub a is engaged in a radial notch e formed in the sleeve c. Accordingly, when a load torque is applied to the sleeve c, the diameter of the coil spring d is decreased due to the torque applied through the hub b, resulting in that the coil spring d is tightly wound on the peripheral surface of the hub a, whereby the rotation of the driving gear is transmitted to the trailing or driven gear. For applying the load torque to the sleeve c, an actuator ring h is pressed against a flange g of the sleeve c under the influence of a cone-like spring f and has a series of stopper teeth i formed on the periphery, which teeth i are adapted to be engaged by the actuating lever 32 shown in detail in FIGS. 2 and 7.

Referring to FIGS. 2 and 7, the actuating lever 32 is rotatably mounted at an intermediate portion thereof on a fourth supporting shaft 36 and is biased by a spring 57 counterclockwise as viewed in FIG. 7. The actuating lever 32 has one end 32a joined to a plunger 37a of an electromagnetic solenoid which is excited in response to a copying command signal. Formed in both side edges of the actuating lever 32 adjacent to the end portion 32a are a first ratchet pawl 38A which is engageable with the peripheral stopper teeth i of the first spring clutch 25 and a second ratchet pawl 38B which is engageable with the peripheral stopper teeth i of the second spring clutch 27. Further, a follower roller 39 is rotatably mounted on the actuating lever 32 at the other end 32b and brought into rolling contact with the peripheral surface of a stopper cam 33 under the influence of a spring 57. Thus, when the electromagnetic solenoid is energized, the first ratchet pawl 38A of the actuating lever 32 is caused to engage with one of the peripheral stopper teeth i of the first spring clutch 25 to rotate the wire pulley 4 in the forward direction, as is indicated by a solid line in FIG. 7, whereby the optical system is moved in the forward direction. Upon completion of the optical scanning of a document, the electromagnetic solenoid 37 is deenergized, as the result of which the actuating lever 32 is displaced under the force of the spring 57 to the position indicated by a broken line in FIG. 7, whereby the wire pulley 4 is rotated in the reverse or backward direction with the optical irradiating system being moved in the backward direction. When the optical system is returned to the initial starting position, the follower roller 39 rides on a protrusion 33a formed in the periphery of the stopper cam 33, resulting in that the actuating lever 32 is rotated in the clockwise direction against the force of the spring 57 to be set at a neutral position shown in FIG. 2, whereupon the wire pulley 4 is stopped.

On the other hand, the driving unit for the paper feeding roller 10 is realized in such a structure as shown in FIG. 6. More specifically, the input sprocket 15 described hereinbefore is supported freely rotatably on a shaft 40 on which the sheet feeding roller 10 is fixedly mounted. A spring clutch 43 is interposed between a hub 15a of the input sprocket 15 and a trailing sleeve 42 secured to the shaft 40 by means of a key 41. The spring clutch 43 comprises a coil spring 44 wound around the hub 15a and the trailing sleeve 42 and a sleeve 46 having peripheral stopper teeth 45. The coil spring 44 has one end secured to the peripheral surface of the sleeve 46. Thus when the sleeve 46 is prevented from rotation by the stopper tooth 45, there is produced slippage between the coil spring 44 and the hub 15a, resulting in that the rotational movement of the input sprocket 15 is prevented from being transmitted to the roller shaft 40.

As shown in FIGS. 2 and 7, the cam follower 34 mentioned hereinbefore is interposed between the control cam 35 and the spring clutch 43. The cam follower 34 is rotatably supported on a fifth supporting shaft 47 at an intermediate portion and biased in the clockwise direction under the influence of a spring 48, whereby a follower roller 49 mounted on the cam follower 34 at one end thereof bears on the peripheral surface of the control cam 35. A ratchet pawl 50 mounted on the cam follower 34 at the other end is adapted to engage in the stopper teeth 45 of the sleeve 46. Accordingly, when the follower roller 49 falls within a notch 35a formed in the control cam 35, as shown in FIG. 2, the sleeve 46 of the spring clutch 44 is prevented from rotation by means of the pawl 50, whereby the rotation of the sheet feeding roller 10 is stopped. On the other hand, when the cam follower 34 is caused to rotate counterclockwise against the force of the spring 48 through the engagement of the follower roller 49 with the peripheral surface of the control cam 35, the sleeve 46 of the spring clutch 43 is in the position to be rotated. Thus, the rotational movement of the input sprocket 15 can be transmitted to the sheet feeding roller 10.

With the arrangement of the apparatus according to an embodiment of the invention described above, the individual elements or members take the positions shown in FIG. 2 before initiation of the copying operation. More specifically, the follower roller 39 of the actuating lever 32 engages with the protrusion 33a of the stopper cam 33 in the neutral state shown in FIG. 2 with the result that the first and the second spring clutches 25 and 27 are at their respective rest positions. Thus, neither the first driving system nor the second driving system transmits the driving power to the wire pulley 4, whereby the movable carriages 2 and 3 for the optical system remain stationary at the initial position. Further, since the follower roller 49 of the cam follower 34 lies in the notch or recess 35a of the control cam 35, the pawl 50 of the cam follower 34 engages with one of the stopper teeth 45 of the spring clutch 43. As the result, the spring clutch 43 is set to the inoperative state, while the sheet feed roller 10 remains stationary.

When the electromagnetic solenoid 37 is energized in response to the copying command signal which is produced by suitable means incorporated in the copying machine and has a duration corresponding to the size of a document to be duplicated, the actuating lever 32 is changed over to the position indicated by the solid line in FIG. 7, resulting in that the second pawl 38B of the actuating lever 32 engages with one of the peripheral stopper teeth i of the first spring clutch 25, whereby the rotation of the ring h is stopped. As the consequence, load torque is applied from the ring h to the sleeve c of the first spring clutch 25, whereby the coil spring d is diametrically contracted or tightened to allow the driving power to be transmitted to the trailing or driven gear 24 from the reduction gear 21. Thus, the wire pulley 4 is rotated in the forward direction to thereby start the movement of the optical irradiation system in the forward direction for effecting the optical scan of the document.

Simultaneously, the cam gear 31 meshing with the trailing gear 24 begins to be rotated in synchronism with the wire drum. Consequently, the follower roller 49 of the cam follower 34 is brought to engagement with the control cam 35 in an appropriate timing relative to the scanning being effected by the optical system, with the result that the pawl 50 is disengaged from the stopper teeth 45 of the spring clutch 43 to thereby allow torque to be transmitted to the roller shaft 40 from the input sprocket 15. Thus, the copying sheet X is fed toward the photosensitive drum 6 at which the image of the document to be duplicated is transferred to the copying sheet X.

Upon completion of the optical scanning of the original or document, the copying command signal is terminated with the result that the electromagnetic solenoid 37 is deenergized, which results in that the actuating lever 32 is changed over under the force of the spring 57 to the position indicated by the broken line in FIG. 7. Then, the first ratchet pawl 38A of the lever 32 engages in the peripheral stopper teeth i of the second spring clutch 27 which is thus rendered operative, whereby torque is transmitted from the input sprocket 14 to the wire drum 4 by way of the intermediate gear 26, the inversion gear 29 and the driven gear 24. Now, the wire pulley 4 is rotated in the reverse or backward direction to cause the optical system to be moved in the backward direction at an increased speed.

When the optical system has attained the initial position, the follower roller 49 of the actuating lever 32 rises on the protrusion 33a of the stopper cam 33, while the follower roller 49 of the cam follower 34 drops in the recess 35a of the control cam 35, whereby the wire pulley 4 and hence the sheet feed roller 10 are stopped.

In the foregoing, description of the invention has been made in conjunction with the optical system for exposure of the type in which the optical system is movable. However, it will be readily appreciated that the invention can equally be applied to the optical system of the type in which the original or document supporting base is movable.

It will now be understood that the present invention has provided an apparatus for driving the optical system which can be realized far more inexpensively as compared with the hitherto known driving apparatus incorporating the electromagnetic clutch by virtue of the inventive combination of the two spring clutches and the single actuator member. When the electromagnetic clutch mentioned above is provided as a separate unit, the size of the apparatus will be correspondingly increased. In contrast, the dimension of the apparatus according to the present invention can be decreased by the width of the electromagnetic clutch and thus can be implemented in a reduced weight, while the manufacturing procedure such as wiring can be simplified.

What is claimed is:

1. In a photocopying machine having an optical system for optically scanning a document to be copied, and a driving force transmitting means for driving said optical system in forward and backward directions for the purpose of scanning of the document to be copied, said driving force transmitting means comprising:

a driving motor;

a rotatable driving force transmitting member coupled to said optical system for driving said optical system in said forward and backward directions;

a first driving system coupled between said motor and said driving force transmitting member for transmitting forward rotational movement to said driving force transmitting member;

a second driving system coupled between said motor and said driving force transmitting member for transmitting reverse rotational movement to said driving force transmitting member;

said first driving system including a first spring clutch for transmitting forward rotational movement to said driving force transmitting member in response to engagement of said first spring clutch;

said second driving system including a second spring clutch for transmitting reverse rotational movement to said driving force transmitting member in response to engagement of said second spring clutch;

an actuating lever having a first engaging member, said actuating lever being selectively movable to a first position at which said first engaging member engages said first spring clutch to cause said first spring clutch to engage to thereby rotate said driving force transmitting member in said forward direction;

spring means coupled to said actuating lever for biasing said actuating lever toward said first position to urge said engaging member toward said first clutch engaging position;

a cam member coupled to said driving force transmitting member and rotatable in correspondence with said driving force transmitting member, said cam member including a cam means for moving said actuating lever from said first position thereof where said actuating lever causes said first spring clutch to engage to cause said driving force transmitting member to rotate in said forward direction, to a second position thereof where said engaging member of said actuating lever releases engagement of said first spring clutch, thereby causing said driving force transmitting member to stop rotating and to stop movement of said optical system and actuating means coupled to said actuating lever for causing said first engaging member of said actuating lever to engage with said second spring clutch of said second driving system to cause said second driving system to transmit reverse rotational movement to said driving force transmitting member to thereby move said optical system in said backward direction toward its original position.

2. The apparatus of claim 1, wherein said actuating lever has a cam follower thereon, and said cam means includes a cam portion engageable with said cam follower of said actuating lever for moving said actuating lever against the force of its spring bias, to a position to disengage from said second spring clutch and to remain disengaged from said first spring clutch, thereby causing said driving force transmitting member to stop rotating and to thereby stop movement of said optical system.

3. The apparatus of claim 1, wherein said cam portion engages said cam follower to cause said stopping of movement of said optical system when said optical system reaches its initial starting position.

4. The apparatus of claim 2, wherein said actuating lever has opposite end portions and is pivotally mounted at an intermediate portion between said opposite end portions, said cam follower being on one of said end portions of said actuating lever and said engaging member being at the opposite end portion of said actuating lever.

5. The apparatus of claim 2, wherein said actuating means comprises an electrical solenoid coupled to said actuating lever.

6. The apparatus of claim 1, wherein said actuating means comprises an electrical solenoid coupled to said actuating lever.

7. The apparatus of claim 1, wherein said first spring clutch comprises a sleeve which is engageable by said actuating lever.

8. The apparatus of claim 1, wherein said first spring clutch comprises a sleeve which is selectively engageable by said first engaging member of said actuating lever, and wherein said second spring clutch comprises a sleeve which is selectively engageable by said first engaging member of said actuating lever.

9. The apparatus of claim 1, further comprising a sheet feeding mechanism including:
a cam follower coupled to said cam member and being actuated by said cam member at a predetermined position of the rotation of said cam member;
a further spring clutch coupled to said cam follower, said cam follower being interposed between said cam member and said further spring clutch; and
at least one sheet feeding roller coupled to said further spring clutch for feeding a sheet when said further spring clutch is energized by actuation of said cam follower.

* * * * *